(12) United States Patent
McKee

(10) Patent No.: US 10,232,942 B2
(45) Date of Patent: Mar. 19, 2019

(54) MODULAR AIRCRAFT CLOSET

(71) Applicant: B/E Aerospace, Inc., Wellington, FL (US)

(72) Inventor: Jefferey McKee, Duvall, WA (US)

(73) Assignee: B/E Aerospace, Inc., Winston-Salem, NC (US)

(*) Notice: Subject to any disclaimer, the term of this patent is extended or adjusted under 35 U.S.C. 154(b) by 214 days.

(21) Appl. No.: 15/098,890

(22) Filed: Apr. 14, 2016

(65) Prior Publication Data
US 2016/0304204 A1 Oct. 20, 2016

Related U.S. Application Data

(60) Provisional application No. 62/147,207, filed on Apr. 14, 2015, provisional application No. 62/147,241, filed on Apr. 14, 2015.

(51) Int. Cl.
B64D 11/00 (2006.01)
B64D 11/06 (2006.01)

(52) U.S. Cl.
CPC ........ B64D 11/003 (2013.01); B64D 11/0023 (2013.01); B64D 11/0602 (2014.12); B64D 2011/0046 (2013.01)

(58) Field of Classification Search
CPC .............. B64D 11/003; B64D 11/0602; B64D 11/0023; B64D 2011/0046
See application file for complete search history.

(56) References Cited

U.S. PATENT DOCUMENTS

| 8,672,267 | B2 * | 3/2014 | Schliwa | B64D 11/02 244/118.5 |
| 9,376,211 | B2 * | 6/2016 | Schliwa | B64D 11/02 |
| 2009/0278429 | A1 * | 11/2009 | Erickson | B64D 11/0015 312/265.1 |
| 2013/0248649 | A1 | 9/2013 | Burd | |
| 2013/0256249 | A1 * | 10/2013 | Burd | B64D 11/04 211/153 |
| 2014/0027574 | A1 | 1/2014 | Obadia et al. | |
| 2014/0125092 | A1 | 5/2014 | Schreuder et al. | |
| 2014/0355282 | A1 * | 12/2014 | Cuddy | B64C 1/1407 362/471 |

(Continued)

FOREIGN PATENT DOCUMENTS

| WO | WO-2013039904 A1 * | 3/2013 | ............. B64D 11/00 |
| WO | WO-2013057137 A1 * | 4/2013 | ............. B64D 11/06 |

OTHER PUBLICATIONS

International Search Report and Written Opinion of corresponding International Application No. PCT/US2016/027498; dated Jul. 1, 2016; 12 pages.

Primary Examiner — Babajide A Demuren
(74) Attorney, Agent, or Firm — Clements Bernard Walker PLLC

(57) ABSTRACT

A modular aircraft closet including a structural frame having a top, a bottom, an inboard sidewall, an outboard sidewall, an open forward face and an open aft face. A forward panel attaches to the structural frame to cover the open forward face and an aft panel attaches to the structural frame to cover the open aft face. The forward and aft panels can be equipped with an exterior panel feature to customize, brand, reconfigure or retrofit the closet.

12 Claims, 5 Drawing Sheets

(56) References Cited

U.S. PATENT DOCUMENTS

2015/0284085 A1* 10/2015 McKee .................. B64D 11/02
                                                                244/118.5
2016/0264246 A1*  9/2016 Young ................... B64D 11/04
2017/0043875 A1*  2/2017 Vervaet ................. B64D 11/02

* cited by examiner

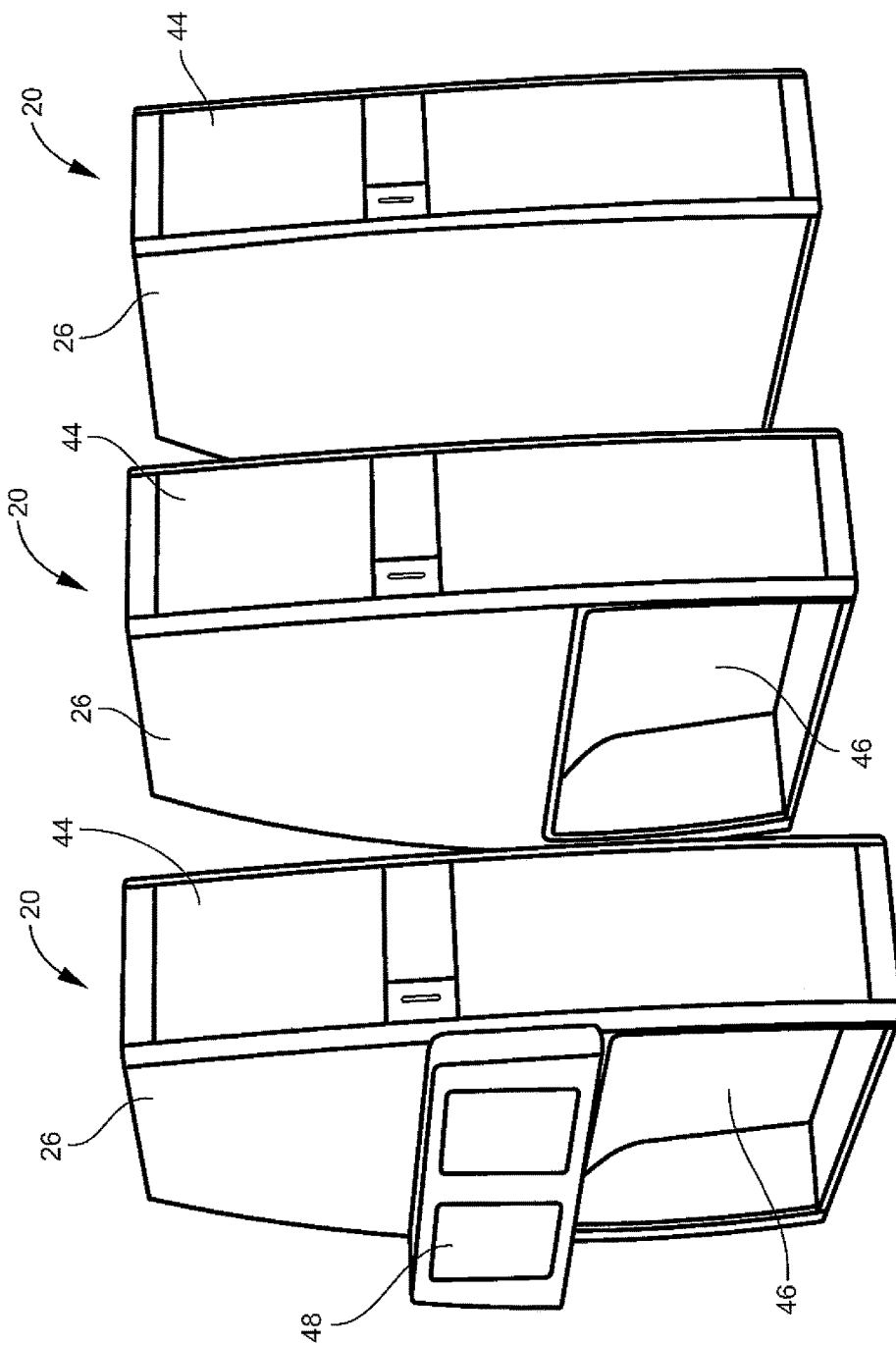

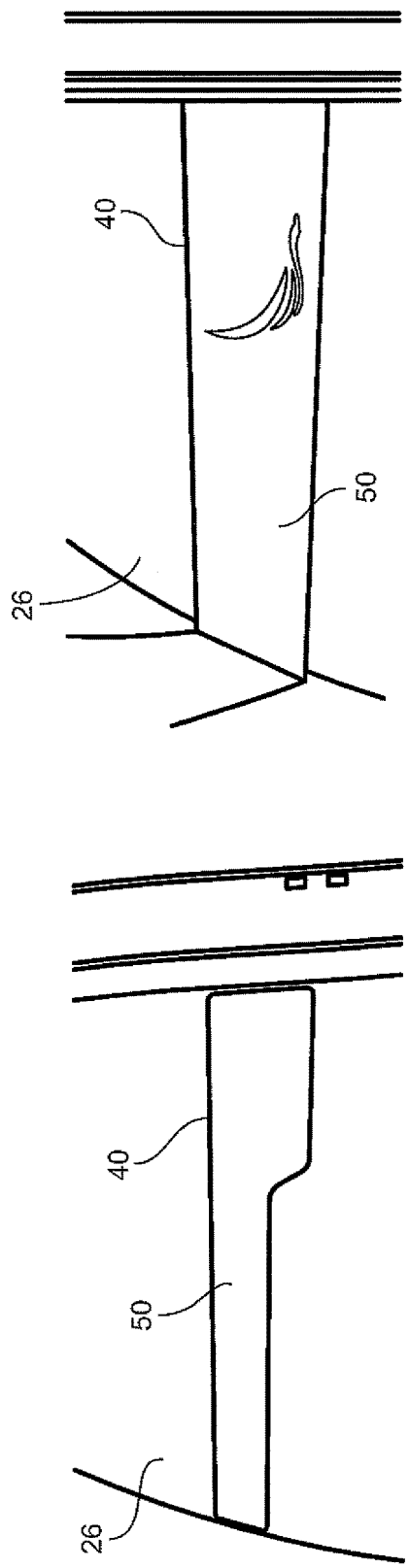
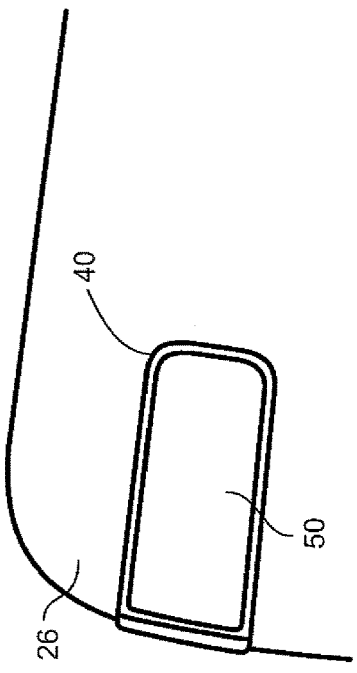
FIG. 4a
FIG. 4b
FIG. 4c

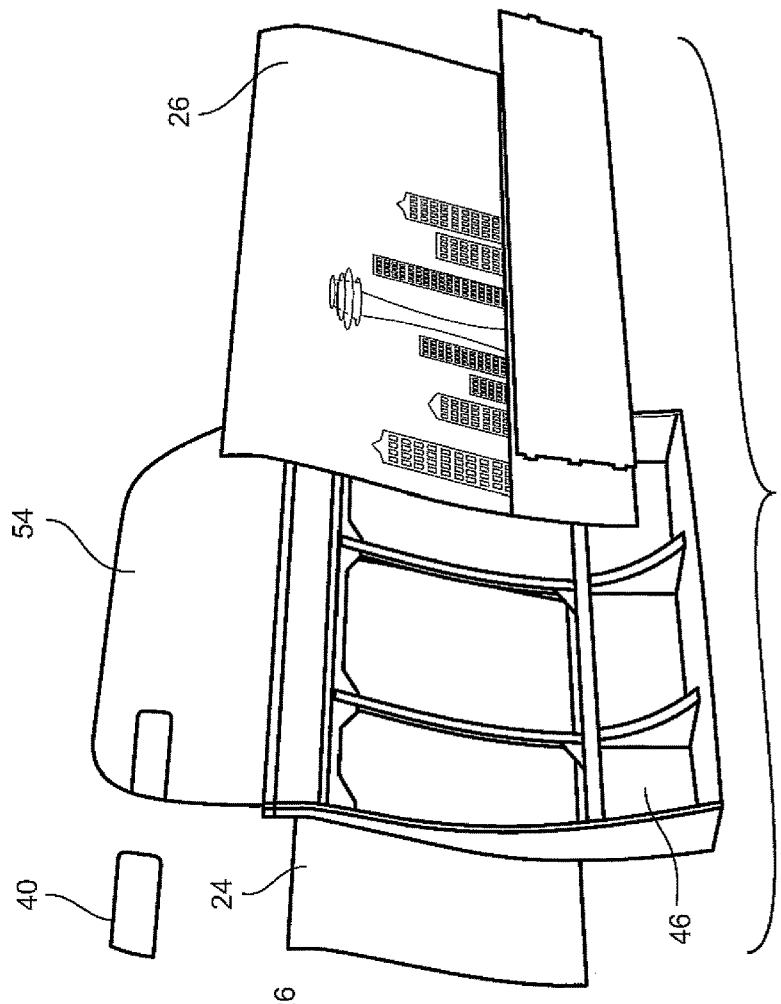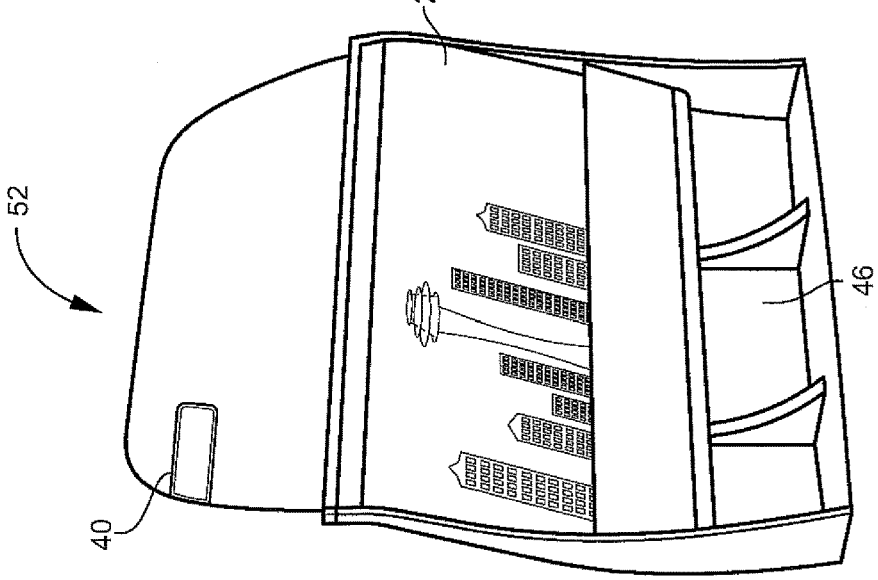

MODULAR AIRCRAFT CLOSET

CROSS-REFERENCE TO RELATED APPLICATION

This application claims priority from U.S. Application No. 62/147,241 filed Apr. 14, 2015, and U.S. Application No. 62/147,207 filed Apr. 14, 2015, the entirety of which are incorporated by reference herein.

TECHNICAL FIELD AND BACKGROUND OF THE INVENTION

The present invention relates generally to a modular constructed monument that supports customization, flexibility and a means to do mid-life upgrades, and more particularly, to a monument including a skeletal substructure which serves as the structural foundation to the whole unit, and a decorative skin structure which is replaceable.

Monuments such as stowage closets, partitions, etc., are conventionally delivered and installed at the time of new aircraft construction. Airlines typically keep the same monuments for the life of the aircraft and do minimal to no updates due to the cost of replacing the entire unit.

As cabin layouts, stowage needs and branding change, it would be desirable to be able to change a monument without having to entirely remove the old monument and replace it with a new one. Therefore, what is needed is an easy and cost-effective way to reconfigure, reface and/or otherwise update an installed monument during its lifetime.

BRIEF SUMMARY OF THE INVENTION

It is an object of the invention to provide a customizable modular monument solution for aircraft.

It is another object of the invention to provide a modular aircraft monument including a universal structural frame and replaceable decorative panels.

It is yet another object of the invention to provide a modular closet having replaceable forward and aft panels that can be decorated, customized and equipped to suit a particular airline carrier's needs.

It is yet another object of the invention to provide a modular class dividing partition having replaceable forward and aft panels that can be decorated, customized and equipped to suit a particular airline carrier's needs.

It is yet another object of the invention to provide a modular monument for separating seating classes or sections within the same seating class in an aircraft.

To achieve the foregoing and other objects and advantages, in a first embodiment the present invention provides a modular aircraft closet including a structural frame having a top, a bottom, an inboard sidewall, an outboard sidewall, an open forward face, and an open aft face, a forward panel adapted to attach to the structural frame and cover the open forward face, an aft panel adapted to attach to the structural frame and cover the open aft face, and at least one exterior panel feature adapted to install in the forward panel or the aft panel.

In a further aspect, the at least one exterior panel feature can be a stowage pocket or a plurality of adjacent stowage pockets each having an insert received through an opening in the forward panel or the aft panel.

In a further aspect, the at least one exterior panel feature can be a foot well including an open-faced insert received through an opening in a lower portion of the aft panel.

In a further aspect, the at least one exterior panel feature can be a removable/replaceable graphical element.

In a further aspect, the inboard sidewall of the structural frame can include a latched door for accessing an interior compartment of the modular aircraft closet.

In a further aspect, the modular aircraft closet can be adapted to be positioned in an aircraft forward of a row of passenger seats with the outboard sidewall adjacent a sidewall of the aircraft, the inboard sidewall adjacent a longitudinal aisle, and the aft panel facing the row of passenger seats.

In a further aspect, the top, bottom, inboard sidewall and outboard sidewall can be an integrated unit.

According to another embodiment, the present invention provides a modular aircraft monument including a structural frame having a top, a bottom, an inboard sidewall, an outboard sidewall, an open forward face, and an open aft face, a forward panel adapted to attach to the structural frame and cover the open forward face, an aft panel adapted to attach to the structural frame and cover the open aft face, and at least one exterior panel feature adapted to install in the forward panel or the aft panel.

In a further aspect, the monument can be a stowage closet, the at least one exterior panel feature can be a stowage pocket or a foot well received through an opening in the aft panel, and the inboard sidewall of the structural frame can include a latched door for accessing an interior compartment.

In a further aspect, the monument can be a seating class dividing partition.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which:

FIGS. 3a-c show perspective views of various modular closet configurations;

FIGS. 4a-c show detailed views of examples of exterior panel features;

FIG. 5 is a perspective view of a modular partition according to an embodiment of the invention; and FIG. 6 is an exploded view of the partition of FIG. 5.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
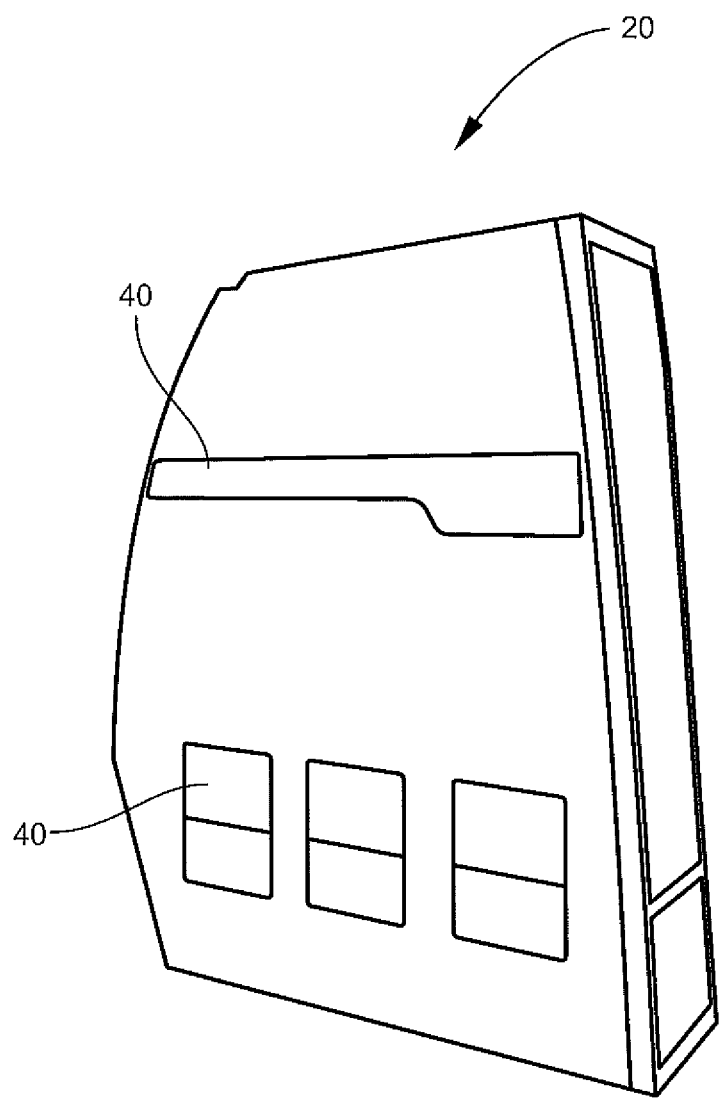
FIG. 1 is a perspective view of a modular aircraft stowage closet according to an embodiment of the invention.
Figure 2:
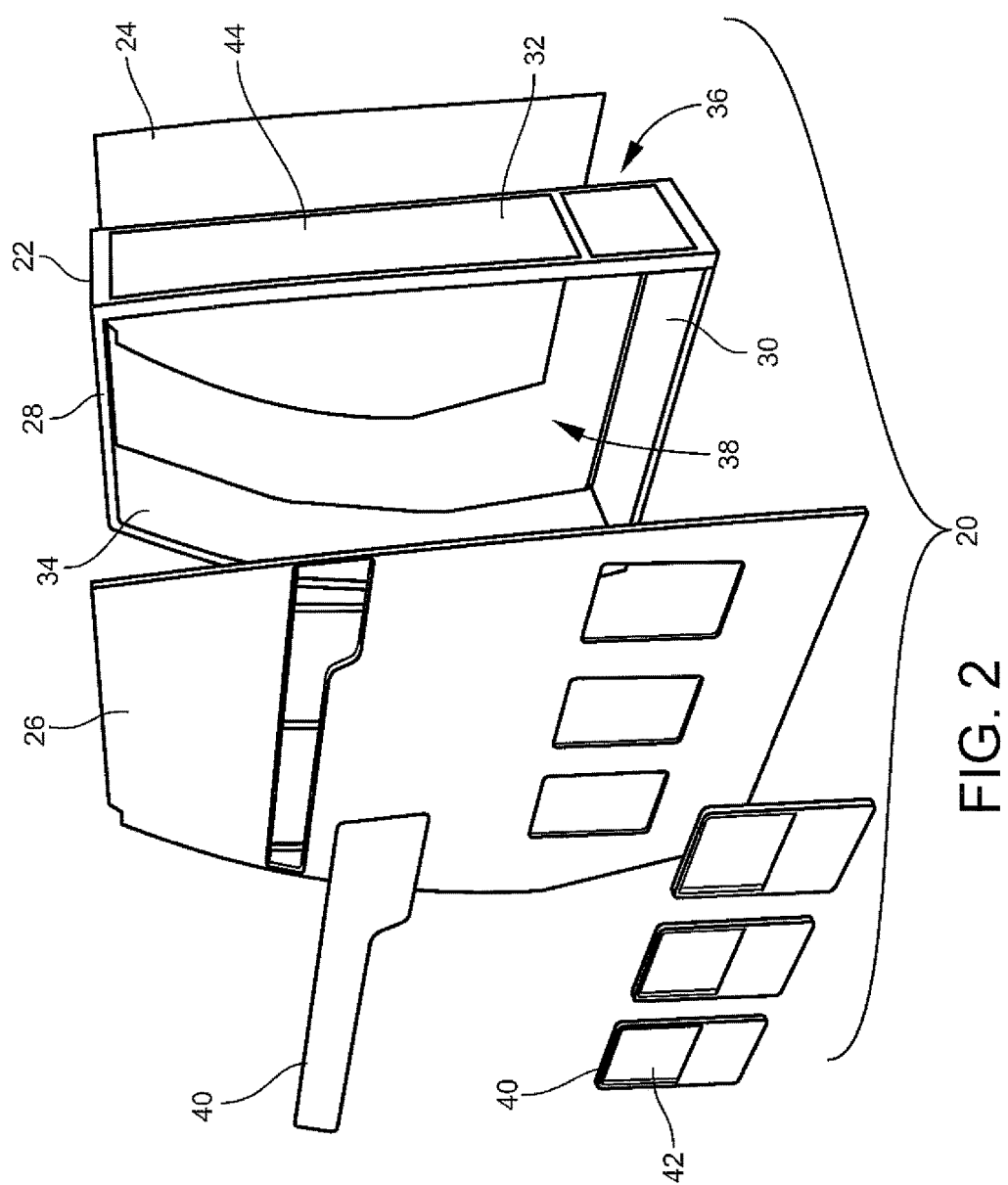
FIG. 2 is an exploded view of the modular stowage closet of FIG. 1.

FIGS. 1 and 2 show a modular aircraft stowage closet 20 according to an embodiment of the invention. Closet 20 can be installed in an aircraft cabin to divide seating classes or sections within the same seating class. Closet 20 generally includes a structural frame 22, a forward panel 24 adapted to attach to the forward side of the structural frame 22, and an aft panel 26 adapted to attached to an aft side of the structural frame 22. The structural frame 22 generally includes a top 28, a bottom 30, an inboard sidewall 32, an outboard sidewall 34, an open forward face 36, and an open aft face 38. When installed, the forward panel 24 covers the open forward face 36 and the aft panel 26 covers the open aft face 38.

The closet 20 can be positioned in an aircraft forward of a row of passenger seats, for example a row of economy class seats, with the outboard sidewall 34 positioned adjacent the aircraft sidewall, the inboard sidewall 32 positioned facing one of the longitudinal aisles, and the aft panel 26 facing the aft row of passenger seats. The bottom 30 can secure to the deck, for example using conventional track fasteners, while the top 28 can secure to the ceiling. Closet 20 thus can be sized and shaped to fill the shape from floor-to-ceiling and from aisle-to-sidewall on one side of the cabin. The outboard sidewall 34 can be curved to follow the curvature of the fuselage.

Closet 20 can further include at least one exterior panel feature 40 adapted to install in one or more of the forward panel 24 and the aft panel 26. The exterior panel feature can be a stowage pocket 42. As show, closet 20 includes a plurality of adjacent stowage pockets 42 each being an insert received through an opening in one of the forward and aft panels 24, 26. Stowage pockets 42 positioned directly forward of passengers seated facing the aft panel 24 can be used to stow passenger personal items, magazines, safety instructions, etc. The inboard sidewall 32 can include a latched door 44 which opens to access the interior of the closet.

The structural frame 22 can be an integrated unit. The structural frame 22 is the primary structural element of the closet, while the forward and aft panels 24, 26 can be decorative and customized based on customer needs. Thus, the structural frame 22 can be the standard structural element while the outer panels are replaceable. Once the structural frame 22 has undergone stress testing and is certified, multiple configurations of the closet can be offered, without the added time and cost of doing required testing on each new unit. After the structural frame 22 is built, any of several configurations can be easily attached to the structural frame, for example using any type of conventional fasteners including, but not limited to, screws, bolts, snaps, clips, etc. Once the structural frame 22 is installed in the aircraft, it can be reconfigured in a retro-fit application without requiring new certification. While much of the look and feel of a conventional closet is retained, closet 20 is configured such that the exterior decorative panels are replaceable. If damaged or needing to change in color or a whole new look, the panels can be replaced without having to completely replace the whole monument structure.

FIGS. 3a-c shows various closet configurations. FIG. 3a, for example, shows closet 20 having an aft panel 26 equipped with an interior foot well 46 in the lower portion thereof and a video monitor unit 48 above the foot well 46. The foot well 46 can be for use by passengers seated in the row immediately aft of the closet 20 and allows the row of seats to be positioned closer to the closet 20. FIG. 3b, for example, shows closet 20 with the foot well 46 in the aft panel 26, but without a video monitor unit. FIG. 3c, for example, shows closet 20 with an aft panel 26 without any exterior panel feature. In each of the closets shown in FIGS. 3a-c, the aft panel 26 can be a decorative panel customized for an airline carrier.

FIGS. 4a-c show various examples of exterior panel features 40 embedded within or mounted to the aft panel 26. FIG. 4a, for example, shows the panel feature 40 in the form of a decorative panel 50 having a predetermined shape that spans the full width of the aft panel 26. FIG. 4b, for example, shows the panel feature 40 in the form of another decorative panel 50 which can be backlit. FIG. 4c, for example, shows the panel feature 40 in the form of a decorative panel 50 positioned to one side of the aft panel. Each of the decorative panels 50 shown in FIGS. 4a-c can be branded differently for each carrier, thus providing a modular closet solution that can be used across all carriers.

FIG. 5 shows a second embodiment of a modular aircraft monument, this time in the form of a class dividing partition 52. The partition 52 also includes an underlying structural frame like the closet embodiment described above. The structural frame is covered on the from face with a front panel 24, on the aft face with an aft panel 26, and one or more of the forward and aft panels 24, 26 can include at least one exterior panel feature 40. The partition 52 is sized and shaped to occupy the space from wall-to-aisle and floor-to-ceiling, and can have a sinusoidal profile as shown to follow the curvature of rows of forward and aft positioned passenger seats. A foot well 46 can be positioned below the aft panel 26, and the foot well 46 can be divided into separate compartments. One or more of the forward panel 24, aft panel 26 and exterior panel features 40 can be decorative or otherwise customized to suit a particular airline carrier. The exterior panel features 40 can be removable graphic elements to change the look of the partition.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A modular aircraft closet, comprising:
    a structural frame including a top, a bottom, an inboard sidewall, an outboard sidewall, an open forward face, and an open aft face adapted to be installed in an aircraft cabin forward of a row of passenger seats with the outboard sidewall facing an aircraft sidewall, the inboard sidewall facing a longitudinal aisle, and the aft panel facing the row of passenger seats;
    a forward panel removably attached to the structural frame and covering the open forward face;
    an aft panel removably attached to the structural frame and covering the open aft face; and
    at least one exterior panel feature installed in an opening in the aft panel, wherein the exterior panel feature closes out the opening and extends into an interior of the structural frame, and wherein the at least exterior panel feature is positioned with respect to the aft panel for use by at least one passenger seated in the row of passenger seats;

wherein the structural frame is configured to remain installed in an aircraft, and at least one of the forward panel, the aft panel, and the at least one exterior panel feature is removable and replaceable separately from the structural frame.

2. The modular aircraft closet of claim 1, wherein the at least one exterior panel feature is a stowage pocket insert.

3. The modular aircraft closet of claim 2, wherein the at least one exterior panel feature includes a plurality of adjacent stowage pocket inserts installed in respective spaced openings in the aft panel.

4. The modular aircraft closet of claim 1, wherein the at least one exterior panel feature is a single, continuous foot well insert having a length substantially corresponding to a length of the row of passenger seats.

5. The modular aircraft closet of claim 1, wherein the at least one exterior panel feature is a removable graphical element closing out the opening in the aft panel.

6. The modular aircraft closet of claim 1, wherein the inboard sidewall of the structural frame includes a latched door for accessing an interior compartment of the modular aircraft closet.

7. The modular aircraft closet of claim 1, wherein the top, the bottom, the inboard sidewall and the outboard sidewall are an integrated unit.

8. A modular aircraft monument, comprising:
a structural frame including a top, a bottom, an inboard sidewall, an outboard sidewall, an open forward face, and an open aft face adapted to be installed in an aircraft cabin forward of a row of passenger seats with the outboard sidewall facing an aircraft sidewall, the inboard sidewall facing a longitudinal aisle, and the aft panel facing the row of passenger seats;
a forward panel removably attached to the structural frame and covering the open forward face;
an aft panel removably attached to the structural frame and covering the open aft face; and
exterior panel features installed in and closing out openings in the aft panel and facing the row of passenger seats, the exterior panel features including at least one of a graphical insert and an open-faced insert that extends into an interior of the structural frame;
wherein the structural frame is configured to remain installed in an aircraft, and at least one of the forward panel, the aft panel, and the exterior panel features are removable and replaceable separately from the structural frame.

9. The modular aircraft monument of claim 8, wherein the monument is a stowage closet, the open-faced insert is a stowage pocket or a foot well, and the inboard sidewall of the structural frame includes a latched door for accessing an interior compartment.

10. The modular aircraft monument of claim 8, wherein the monument is a seating class dividing partition.

11. The modular aircraft monument of claim 8, wherein the graphical insert is positioned above the open-faced insert on the aft panel.

12. The modular aircraft closet of claim 8, wherein the top, the bottom, the inboard sidewall and the outboard sidewall are an integrated unit.

* * * * *